ated by Harrison & Butterfield's, 1922.

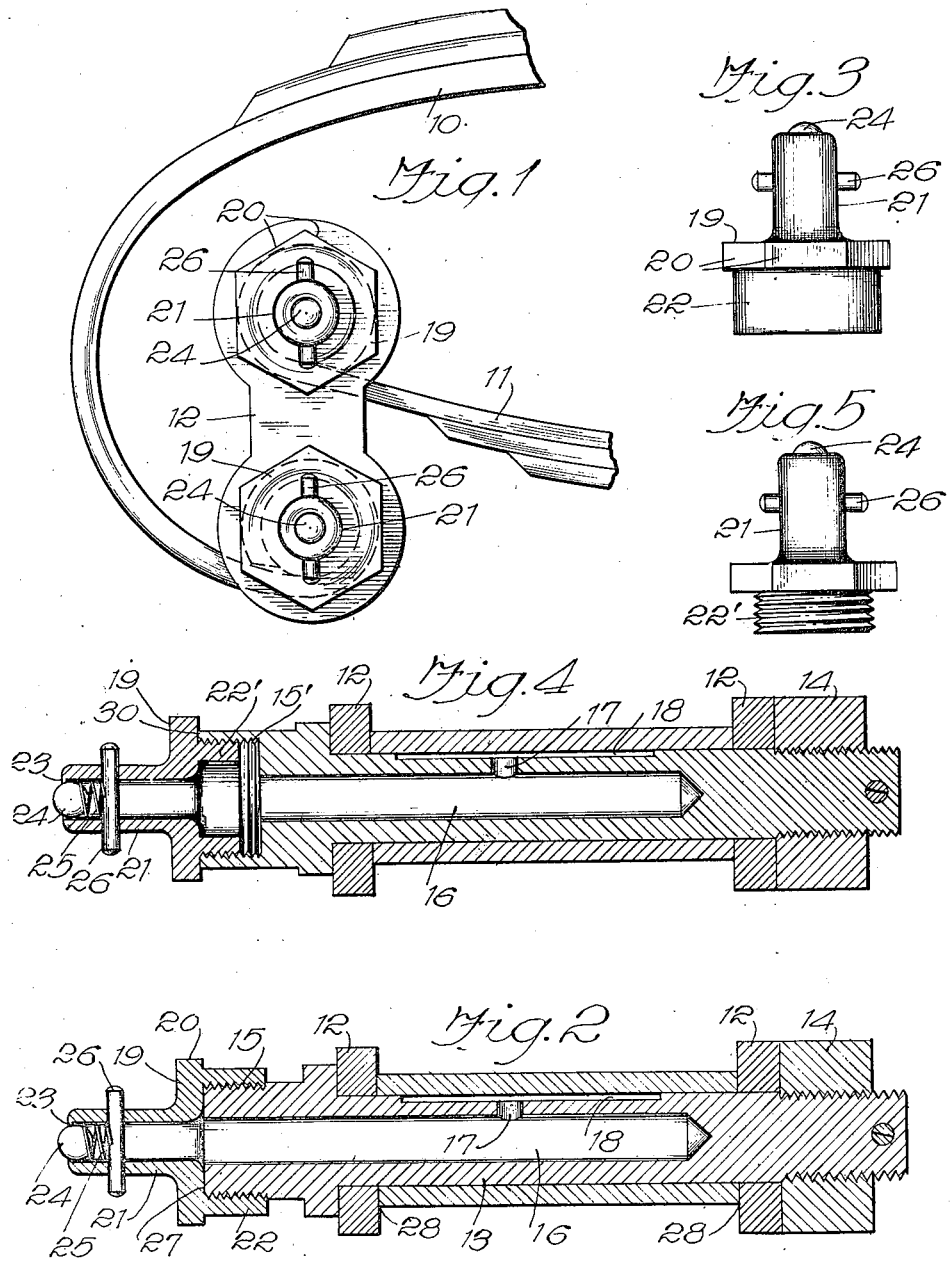

UNITED STATES PATENT OFFICE.

ARTHUR V. GULLBORG, OF CHICAGO, ILLINOIS, ASSIGNOR, BY MESNE ASSIGNMENTS, TO THE BASSICK MANUFACTURING COMPANY, A CORPORATION OF DELAWARE.

LUBRICATING APPARATUS.

1,404,758.      Specification of Letters Patent.     Patented Jan. 31, 1922.

Application filed April 21, 1919. Serial No. 291,776.

*To all whom it may concern:*

Be it known that I, ARTHUR V. GULLBORG, a citizen of the United States, residing at Chicago, in the county of Cook and State of Illinois, have invented a certain new and useful Improvement in Lubricating Apparatus, of which the following is a full, clear, concise, and exact description, reference being had to the accompanying drawings, forming a part of this specification.

My invention relates to improvements in lubricating apparatus, and is especially concerned with improvements or modifications of that type of lubricating apparatus disclosed in my co-pending applications Serial Numbers 216,586 and 267,858, filed on February 11, 1918, and December 21, 1918, respectively.

The objects of my present invention are:

First, to provide means to be used in connection with shackle bolts, such as are used in connection with springs, steering knuckles, and other portions of automobile and other mechanisms, whereby lubricant can be forced into these various bearings under extremely high pressure, so as to displace the used lubricant and flush the bearings with a fresh supply of lubricant, and also comprising means whereby additional lubricant can be supplied to the bearings under a reduced pressure; and Second, to provide apparatus of this description which is simple in construction, economical to manufacture, and which can be used with shackle bolts of standard construction and dimension.

Other objects will appear as this description progresses, reference being had to the accompanying drawings, in which—

Figure 1 is a side elevation of a portion of an automobile spring, showing my improved lubricating apparatus attached thereto;

Figure 2 is a central longitudinal section through a shackle bolt and my improved lubricating device;

Figure 3 is a side elevation of the device disclosed in section in Figure 2;

Figure 4 is a central longitudinal section similar to Figure 2, except that it discloses a different type of shackle bolt equipped with a slightly modified form of my lubricating device; and Figure 5 is a side elevation of the lubricating device disclosed in Figure 4.

Throughout the several views similar reference characters are used for referring to similar parts.

Referring to the drawings, the reference characters 10 and 11 represent the upper and lower end portions of an automobile spring, which are connected by a pair of shackles 12. As shown in Figure 2, a shackle bolt 13 extends through suitable registering openings in the two shackles 12. The shackle bolt 13 is held in place by means of a nut 14. The opposite end of the shackle bolt is exteriorly screwthreaded, as shown at 15. A lubricating passage 16 extends through a portion of the shackle bolt and opens through the end provided with the screwthreads 15. The passage 16 has a lateral extension 17 in the side of the shackle bolt, which is adapted to hold lubricant in contact with the portion of the spring which is journaled upon the shackle bolt.

The shackle bolt just described is of standard construction, and the end which is provided with the screwthreads 15 is ordinarily provided with a screwthreaded cap, which serves to some extent as a grease cup, but the function of which is primarily to retain lubricant in the passageway 16 and to exclude dust and dirt therefrom. Where grease cups such as those just described are employed, it is impossible to place the lubricant in the passageway 16 under comparatively high pressures, for the reason that if it is attempted to do so, the lubricant escapes between the grease cup and the co-acting threaded end of the shackle bolt. Furthermore, it is difficult to exert sufficient force upon an ordinary grease cup to develop any considerable pressure in the passageway 16. These limitations of the ordinary grease cup have compelled automobile manufacturers to make the joints between the shackle bolts and the bearing portions of the springs and other corresponding portions of automobiles comparatively loose, so as to insure an adequate supply of lubricant to all of the contacting surfaces of the shackle bolt and the bearing journaled thereon. This construction results in rapid wearing of the shackle bolt and the part bearing thereon, and these parts after some wear begin to rattle in a disagreeable manner.

It is one of the objects of my invention to provide means for supplying lubricant to a shackle bolt under such extremely high pressure that even though the shackle bolts are made to fit tightly in the parts journaled thereon, the lubricant will, by reason of its high pressure, contact with all of the parts of the bearing surfaces. My improved devices can also be used with the shackle bolts at present in use, and permits of the nuts 14 being tightened to such an extent as to partially eliminate the movement of the shackle bolts and the parts bearing thereon, so as to eliminate the noise and wear due to the relative movements of these parts.

My improved device, which is to replace the ordinary grease cup, comprises a centrally perforated disk 19 having facets 20 formed on the edge thereof, to co-act with the jaws of a wrench, or to form a hand grip. Tubular extensions 21 and 22 extend from the opposite sides of the disk 19, the extension 22 being of greater diameter than the extension 21, and being interiorly screw-threaded to co-act with the screwthreads 15. The tubular extension 21 has its outer end flanged over as shown at 23, to form a seat for the ball closure 24. The ball closure 24 is urged against its seat by means of a spiral spring 25, one end of which rests upon the central portion of the pin 26, which extends through both walls of the tubular extension and projects therefrom to form means for establishing a detachable connection with the nozzle of a grease gun such as that disclosed in my co-pending applications referred to above. These grease guns are provided with nozzles or discharge conduits, the free ends of which have coupling members provided with bayonet slots for co-acting with the ends of the pins 26. When such a pump is connected with one of the couplings just described, the lubricant can be forced past the ball closure 24 and through the coupling under extremely high pressure, and after the passageway 16, its extensions 17, and the recess 18 are filled with lubricant, this lubricant can be placed under a high pressure so as to force it into every portion of the space between the shackle bolt and the part bearing thereon, so as to displace all of the used, contaminated lubricant and replace it with fresh lubricant.

In order to get this high pressure upon the lubricant in the passageway 16, it is necessary that my improved coupling should be completely threaded onto the end of the shackle bolt, so that the disk will contact with the end of the shackle bolt at the point 27 to form a seal to prevent the escape of lubricant between the coupling and the shackle bolt. After the bearing has been completely filled with fresh lubricant, as will be evidenced by the escape of clean lubricant at the points 28, the coupling member can be partially unscrewed from the end of the shackle bolt, and lubricant can be forced into the space thus created under less pressure. New lubricant can then be supplied to the bearing portions by simply screwing the coupling onto the shackle bolt, as desired, in just the same manner as ordinary grease cups are employed. The ball closure 24 serves to prevent the escape of lubricant from the coupling.

In Figures 4 and 5 I have illustrated a slightly modified form of my invention, in which the end of the shackle bolt is interiorly threaded, as shown at 15', and the co-acting tubular extension 22' of my improved coupling is exteriorly threaded. It will be noted that when the coupling device disclosed in Figure 4 is completely threaded into the end of the shackle bolt, a sealing contact is established at the point 30, which will prevent the lubricant from escaping between the shackle bolt and the coupling when the lubricant is forced into the passageway 16 under high pressure.

It will be clear from the above description that I have provided means in connection with a shackle bolt whereby lubricant can first be forced into the space between the bearing portions under extremely high pressure. The coupling member can then be unscrewed from the shackle bolt and an additional supply of lubricant forced into the coupling under a lower pressure, and that this additional supply of lubricant can be forced into the bearing portions as desired, by simply screwing the coupling member onto the shackle bolt in the same manner in which ordinary grease cups are actuated to force additional lubricant into a bearing.

While any suitable material can be used for making the couplings illustrated in this application, and while they can be made in any desired way, I find that these couplings can be economically made by a die casting process.

While I have described the details of the preferred embodiments of my invention, it is to be understood that they are capable of other adaptions and modifications within the scope of the appended claims.

Having thus described my invention, what I claim is:

The combination with a shackle-bolt having a screw threaded end provided with a lubricant passage, of a coupling having a hollow screw threaded tubular extension for co-acting with the screw threaded end of said shackle-bolt, the exterior of the free end of said coupling being smooth, co-acting means on said coupling and shackle-bolt for sealing the connection between said coupling and shackle-bolt when said coupling is completely threaded onto said shackle-bolt, said coupling comprising means for making a quick detachable connection with a lubricant compressor.

In witness whereof, I hereunto subscribe my name this 16 day of April, 1919.

ARTHUR V. GULLBORG.

Witnesses:
 JOHN L. STEFFEN,
 GEO. P. ADAMS.